United States Patent Office 3,298,992
Patented Jan. 17, 1967

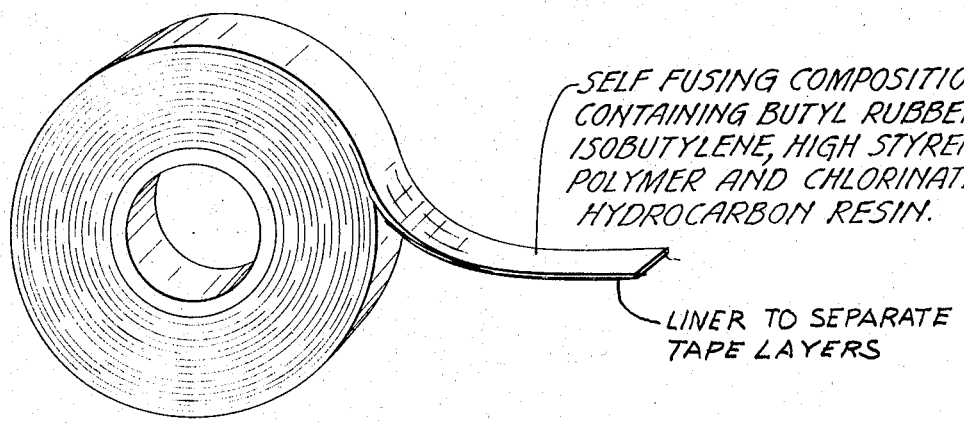

3,298,992
HIGH DIELECTRIC STRENGTH INSULATING COMPOSITION
Herbert M. Bond, Stillwater, Wash., and Robert B. Snell, White Bear Lake, Minn., assignors to Minnesota Mining and Manufacturing Company, St. Paul, Minn., a corporation of Delaware
Filed Oct. 2, 1962, Ser. No. 228,784
4 Claims. (Cl. 260—41.5)

The invention relates to high dielectric strength insulating compositions and is a continuation-in-part of application Serial No. 834,476 filed August 18, 1959, now abandoned. More particularly this invention relates to high dielectric strength insulating compositions, particularly in tape or sheet form, which insulating compositions have greatly improved electrical properties and handleability over a wide temperature range.

Tapes made up of insulating compositions of the type with which this invention is concerned have been known and used for many years, primarily as tapes to wrap and splice electrical cables. Originally, nearly all of these self-sealing compositions, usually in tape form, were natural rubber based; however, the susceptibility of unsaturated molecules to ozone decomposition causes them to deteriorate rapidly in use around electrical equipment and high voltage lines where ozone generating atmospheres are created. These tapes tend to harden and crack in cold weather and, being self-vulcanizing, their shelf-life is relatively short. Further, these compositions have poor high voltage endurance; i.e., they break down and pyrolize with continued high voltage thereacross, a significantly undesirable characteristic since one of the primary uses of these compositions in tape form is as a high voltage cable splicing tape.

To improve upon these deficiencies, other high dielectric strength insulating compositions based on butyl rubbers and polyisobutylenes with extremely small amounts of unsaturated material present therein were introduced into the market place. More recently polyethylene reinforced butyl rubber-isobutylene containing self-sealing insulating compositions were introduced, such compositions being described in Patent Nos. 2,569,540 and 2,569,541, issued to Harold E. Selby on October 2, 1951. While improvements over natural rubber based compositions, these latter compositions likewise possess poor high voltage endurance, have short life spans in high ozone atmospheres and lack good high and low temperature properties, as evidenced by poor flexibility and fusing characteristics, at low temperatures, e.g., around 0° F., and loss of dielectric strength coupled with either sever shrinkage or brittleness upon prolonged exposure to high temperatures on the order of about 275° F.

The present invention provides a high dielectric strength insulating composition which sacrifices none of the desirable properties of the previously known insulating compositions of this nature, but which composition has increased high voltage endurance, ozone and high temperature resistance coupled with good handleability, the latter characteristic being evidenced by good flexure and fusion at temperatures as low as 0° F. and the absence of shrinkage or brittleness at high temperatures, e.g., 275° F.

The high dielectric strength, high voltage enduring, self-fusing insulating compositions of this invention comprise blends or combinations of butyl rubber and high molecular weight isobutylene polymers with a styrene polymer containing from about 10 to about 20% butadiene and a chlorinated hydrocarbon resin. These compositions have been found to provide self-fusing tapes prossessing greatly improved ozone resistance and resistance to temperature decomposition in addition to possessing good handleability characteristics over wide temperature range from at least 0° F. to about 125° F. In the accompanying drawing there is illustrated a tape formed of a composition of this invention.

In addition to the major components already mentioned, these new compositions usually contain conventionally used filler, such as inorganic oxides, silica, etc. The compositions may also contain further additives for special effects, in the nature of reinforcers, e.g., dinitrosobenzene, preservatives (rubber antioxidants), extenders, pigments and even tackifying agents, such as the ester gums, rosin, and polyterpene resins, although in contrast to previous high dielectric strength insulating compositions, the insulating compositions of the present invention require no separate tackifying agent.

While the precise part each major component plays in imparting the desirable electrical and other characteristics to the basic composition of this invention is not absolutely defined, certain gross physical characteristics of each component which contribute to the properties of the final composition are believed fairly well established, as indicated hereinafter.

Thus, the butyl rubber provides the rubberiness and stretch to the composition and possesses good physical strength while the high molecular weight isobutylene polymer provides controlled flow (enough to flow to fuse without flowing to shapelessness), resilience and tear strength. The high styrene polymer (80–90% styrene to 20–10% butadiene or its equivalent), appears to toughen and strengthen the composition and, surprisingly, since it is a brittle resin, provides the composition with good handleability at low temperatures and high temperatures. Further, this high styrene polymer and its chlorinated copatibilizing resin appear to provide the composition with greatly enhanced high voltage ozone and high temperature resistance as compared to compositions which do no contain these components.

Prior to this invention the high styrene polymer was not considered compatible with butyl rubber; however, the chlorinated hydrocarbon resin appears to not only compatibilize this high styrene polymer component with the butyl rubber and the other components, but produces for all practical purposes, a homogeneous blend of these ingredients having a remarkable combination of desirable properties in the self-fusing tape and insulating composition field.

The butyl rubber, which rubber is a copolymer of isobutylene and a diolefin (usually 2-methyl butadiene-1,3), containing less than about 1.5 weight percent diolefin, is sulphur vulcanizable and should be present in parts by weight, relative to the other three major components of the composition, of about 30–50 parts butyl rubber. Beyond these limits the valuable properties of the butyl rubber in the composition are not adequately utilized, too little providing inadequate rubberiness and too much providing inadequate strength.

The amount of the polyisobutylene, in parts by weight, again these parts being relative to the parts of the other three major components of the composition, is from 15 to 35 parts, and preferably around 25 parts. Polyisobutylene having an average molecular weight of at least about 60,000 (as measured by the P. J. Flory method described in J.A.C.S. vol. 65 p. 372, March 1943, "Molecular Weight and Intrinsic Viscosity of Polybutenes") is used to provide compositions having adequate physical strength for most commercial applications. Polyisobutylenes having average molecular weights as high as about 135,000, the maximum commercially available, have also been successfully used. Polyisobutylenes with lower average molecular weights than about 60,000 produce compositions deficient in flow characteristics.

The amount of the styrene-butadiene polymer useful in the composition has been found to be about 12 to 24 parts, and preferably about 18 parts, lesser amounts providing insufficient increase in total properties to be practical and excessive amounts making the composition too stiff in sheet or tape form for requisite handleability.

The chlorinated hydrocarbon resin is preferably a chlorinated polyphenyl resin, containing from about 20 to about 70% by weight chlorine, this resin being utilized in approximately the same proportions, namely from 12 to about 24 parts by weight, and preferably about 16 parts, as the high styrene polymer.

A preferred group of chlorinated hydrocarbons are the "Aroclor" resins marketed by Monsanto Chemical Company. These resins are a series of chlorinated biphenyls and higher polyphenyls which vary from water-white, mobile liquids and pale yellow oils to crystalline solids. These chlorinated hydrocarbons are permanently thermoplastic. A partial list of these chlorinated hydrocarbons and their properties is found at page 65 of the "Handbook of Material Trade Names," Zimmerman and Lavine, 1953 edition, published by Industrial Research Services, Dover, New Hampshire.

As a practical matter it is usually desirable to add a filler to the composition. Inert, good high dielectric strength fillers such as clay, inorganic oxides, silica and other common reinforcing fillers known to the art are useful for this purpose. Considering the butyl rubber and polyisobutylene rubber as the rubber base for the composition, the amount of filler can be anywhere up to about 70% of the weight of the rubber base with no filler. Preferably, the amount of the filler has been found to be between about 40-70% of the weight of the base rubber, the optimum amount of filler being about 60%.

The invention is further described with reference to the examples following.

*Example 1*

| Component: | Parts by weight |
|---|---|
| Butyl rubber, "0–35" (less than 1% unsaturation, marketed by Enjay Company, Inc.) | 40 |
| Polyisobutylene rubber, molecular weight average 99,000–117,000 Vistanex "L–120" (Enjay Company, Inc.) | 22.5 |
| Silicon dioxide (diatomaceous earth type, marketed by Johns-Manville Inc. as "Celite 270") | 35 |
| Chlorinated polyphenyl resin (54% chlorine) "Aroclor 1254" (tradename of Monsanto Chemical Co.) | 15 |
| Styrene-butadiene, 85:15 copolymer, "Pliolite S-6B" (the name under which this copolymer is marketed by Goodyear Tire & Rubber Company, Inc.) | 17.5 |

In the formation of the insulating composition, the butyl and polyisobutylene rubbers were broken down together on a cold, two roll, rubber compounding mill by uniform mixing for about 5 to 10 minutes with steam applied to the mill rolls thereafter to heat them to about 275–330° F. The smooth, pre-milled rubber was then mixed with the styrene-butadiene copolymer and fused at a temperature of 315–325° F. While higher heats can be used, such higher heats cause sticking of the rubber to the steel rolls of the mill and require additional mill time. Lower heats also can be used but these again increase the mixing time.

After the rubber and resin were milled in the manner noted hereinbefore, the mill rolls were cooled to room temperature and the $SiO_2$ filler and chlorinated phenyl resin added. These materials were added together as a paste; however, they can be incorporated separately to effect the same result. The total mill time for these operations is about 40 minutes.

An alternate procedure that has been used is to mix all the ingredients cold in a Banbury mixer and thereafter gradually heat to about 330° F. while mixing, wherein the ingredients are fused. The resultant mass is then cooled and dumped for calendering.

To calender into sheet form, the formed high dielectric strength self-sealing insulating composition resulting from the foregoing procedure was sheeted to a thickness of about 30 mils onto a permanent liner using a three roll calender. The sheeted material was wound on rolls and slitted into tapes, the calendering temperature being about 200° F. on all the calender rolls. The tape fused, or self-sealed, to itself very well at room temperature as determined by elongating the tape 100% and wrapping it on a copper bar one half inch in diameter and 4 inches long. The dielectric strength was over 500 volts per mil.

*Example 2*

Tapes of approximately 30 mils thickness were prepared as in Example 1 utilizing the composition of Example 1, and adding thereto about 12.5 parts of a 75:25 butadiene-styrene rubber without loss of electrical properties and with increased physical strength.

*Example 3*

30 mil tapes were prepared from a composition differing from that of Example 1 by the addition to the other components of about ¼ part dinitrosobenzene and about 12.5 parts of 75:25 butadiene-styrene rubber without loss of electrical properties.

*Example 4*

Tapes of approximately 30 mils thickness were prepared from the composition of Example 3 to which 1.5 parts of a conventional tackifying resin, "Piccolyte S–85," a polyterpene resin having a melting point of 85° C., was added. These tapes likewise displayed no loss in electrical properties.

*Example 5*

A preferred tape is that of the composition following:

| | |
|---|---|
| Butyl rubber | 64 |
| Polyisobutylene (120,000 m.w.appx.) | 36 |
| Silicon dioxide filler | 56 |
| "Aroclor 1254" (54% chlorinated polyphenyl) | 24 |
| 85:15 styrene-butadiene copolymer | 28 |
| Zinc oxide | 5.0 |
| 75:25 butadiene-styrene (stiffener) | 20 |
| Carbon black (reinforcing-color) | 12 |
| "Piccolyte S–85" (tackifier) | 2.4 |
| Dinitrosobenzene (reinforcing) | .5 |

The additives to the composition provided increased storage life and physical properties to the tape without detracting from the desired electrical properties.

When subjected to a continuous voltage, thereacross of 10,000 volts, 32 mil tapes of the composition of the preceding example displayed no voltage breakdown for 55,000 seconds, and when subjected to a continuous voltage thereacross of 7,000 volts displayed no breakdown for 300,000 seconds. Equally high value are obtained with the compositions of the other examples. This resistance is about 10 times as great as that registered with other similar tapes and, in effect, means that insofar as voltage endurance is a criterion, tapes of the compositions of this invention may be wrapped around cables in splicing and similar operations to less than the thickness of other similar tapes to afford the same electrical protection.

A comparison of tapes made up of these compositions with presently marketed tapes of other similar compositions is set forth in the table following.

chlorinated resin was 8.6 lbs./inch with an elongation of 575% at a thickness of 31.5 mils. The tape with the 68% chlorinated polyphenyl resin had a thickness of 31 mils, a tensile strength of 7.2 lbs./inch and an elongation of 700% at break. Both tapes exhibited good appearance and were easily handleable. Excellent splices were made on rubber cables using these tapes.

TABLE

| | One week in Ozone Chamber Having 150 p.p.m. Ozone | Handleability at 0° F. | After 72 Hours in Air Circulating Oven at 275° F. |
| --- | --- | --- | --- |
| Composition of Example 1 | No cracking; observed under 120X microscope; fused well at rm. temp. dielectric strength over 500 mil./volt. | Unwound easily from roll; stretched well, fused to itsel when wrapped on copper bar.* | No significant loss in dielectric strength or physical properties.** |
| Tape comprising vulcanized composition of crude rubber-inert filler-vg. oil factice. | Severe cracking after 24 hrs | Unwound from roll but displayed poor stretch; failed to fuse to itself when wrapped on copper bar. | Tape became permanently brittle. |
| Tape comprising butyl rubber-polyisobutylene polyethylene. | Severe cracking after 24 hrs | Unwound from roll but displayed poor stretch; failed to fuse to itself when wrapped on copper bar. | Tape had shrunk severely and lost its electrical strength. |
| Tape comprising vulcanized composition of butyl rubber-filler-gum. | Severe cracking after 24 hrs | Unwound from roll but displayed poor stretch; failed to fuse to itself when wrapped on bar. | |

*Composition of Example 2.
**Composition of Example 3.

For the most part, the table and the tests carried out therein are self explanatory and all of the tape samples were subjected to identical conditions insofar as duplication of conditions was possible. With respect to the handleability at 0° F. the tapes were all stretched and wrapped on the copper bar at the 0° F. temperature and the fusing of the tape to itself as wrapped on the bar observed at this temperature. As is apparent from the Table the high styrene polymer containing compositions of the present invention display greatly improved useful properties heretofore not obtained in this art.

It is to be noted that the addition of the GRS rubber, the dinitrosobenzene and other ingredients to the basic composition, or the addition of any of them, while not responsible for the 0° F. and 275° F. properties of the composition, do not detract from these properties. The basic composition, in tape form, without these additives performs about as well under the same conditions as does the tape of Example 5. The resistance to ozone atmospheres of the compositions of this invention is remarkable, no ozone cracking being observed after one week in the ozone atmosphere even under a 120 power microscope.

Following the procedures of the foregoing examples, other satisfactory tapes have been made wherein chlorinated polyethylene has been used in place of the chlorinated polyphenyl resin.

*Example 6*

Further tapes were made by substituting the following chlorinated hydrocarbons in the formulation of Example 5 for that set forth in the example.

(1) 32% chlorinated polyphenyl resin ("Aroclor 1232").
(2) 68% chlorinated polyphenyl resin ("Aroclor 1268").

In the formation of the tapes the butyl rubber and the polyisobutylene were broken down and mixed on a rubber mill at room temperature for about 5 minutes. The butadiene-styrene rubber was then added and the mixture milled for about 10 minutes. The 85:15 styrene-butadiene copolymer was then added on a hot mill (280° F. to 330° F.). Thereafter at room temperature the remaining ingredients were added, the compound mixed for 40 minutes, calender sheeted and made into tapes.

Both tapes exhibited good appearance and were readily self-fused. The tensile strength of the tape with the 32%

*Example 7*

In this example a 40% chlorinated aliphatic hydrocarbon resin was substituted as the chlorinated resin in the formulation of Example 5, and the tape otherwise made in accordance with the procedure outlined in Example 6.

The tape, which had a thickness of 25 mils, exhibited a tensile strength of 3.7 lbs./inch and an elongation at break of about 1200%. The tape had a smooth appearance, good dielectric strength and was readily self-fused when wound upon itself.

A tape having similar properties was made using as the chlorinated hydrocarbon resin an 89:11 copolymer of vinyl chloride and vinyl acetate having a molecular weight of about 15,000. About 60 parts of this resin was incorporated into the formulation of Example 5 and the compound processed in the manner described hereinbefore into a tape having a thickness of 26.5 mils. The tensile strength of this tape was 2.5 lbs./inch with an elongation at break of 1300%. The tape handled nicely and self-fused readily to itself, making excellent tape splices.

Also, cotton and other fabrics have been impregnated with the compositions of this invention to form useful self-fusing insulatory tapes.

From the foregoing description it is believed the invention will be readily understood by those skilled in the art; however, since numerous modifications of the preferred composition specifically described are possible, as noted hereinbefore, it is to be understood that the compass of the invention is as defined in the appended claims.

What we claim is as follows:

1. A high dielectric strength insulating composition possessing improved high voltage endurance, ozone resistance and handleability over a wide temperature range, said composition comprising in a parts by weight relative to one another, (1) about 30–50 parts of a butyl rubber copolymer of isobutylene and a diolefin containing no more than about 1.5 weight percent diolefin, (2) about 15–35 parts of a high molecular weight polyisobutylene of at least about 60,000, (3) about 12–24 parts of a chlorinated hydrocarbon resin containing from 20 to 70% chlorine and, (4) about 12–24 parts of a copolymer of about 80–90% styrene and 10–20% butadiene.

2. A high dielectric strength insulating composition comprising in parts by weight, (1) about 30–50 parts of a butyl rubber copolymer of isobutylene and a diolefin having no more than about 1.5 percent by weight diolefin, (2) about 15–35 parts by weight polyisobutylene having an average molecular weight of at least about 60,000, (3) about 12–24 parts of a chlorinated hydrocarbon resin containing from 20 to 70% chlorine, (4) about 12–24 parts of a copolymer of about 80–90% styrene and 10–20% butadiene, and (5) up to about 70 parts inert filler based on the combined weight of the butyl rubber and the isobutylene.

3. A high voltage and ozone resistant self fusing insulating tape comprising in parts by weight, (1) about 30–50 parts of a butyl rubber copolymer of isobutylene and a diolefin having no more than about 1.5 percent by weight diolefin, (2) about 15–35 parts by weight polyisobutylene having an average molecular weight of at least about 60,000, (3) about 12–24 parts of a chlorinated hydrocarbon containing 20 to 70% chlorine, (4) about 12–24 parts of a copolymer of about 80–90% styrene and 10–20% butadiene, and (5) up to about 70 parts inert filler based on the combined weight of the butyl rubber and the isobutylene.

4. A high voltage and ozone resistant self-fusing insulating tape wound in roll form comprising in parts by weight, (1) about 40 parts butyl rubber copolymer of isobutylene and a diolefin having less than 1.5 percent diolefin, (2) about 25 parts by weight polyisobutylene having an average molecular weight of at least about 60,000, (3) about 16 parts of a chlorinated polyphenyl resin containing from 20 to 70% chlorine, (4) about 18 parts of an 85:15 styrene-butadiene copolymer, and (5) about 40–70 parts filler per 100 parts isobutylene and butyl rubber.

No references cited.

MORRIS LIEBMAN, *Primary Examiner.*

K. B. CLARKE, *Examiner.*

J. S. WALDRON, *Assistant Examiner.*